March 22, 1960

P. CROCCHI 2,929,198

DRIVE SYSTEM

Filed Feb. 25, 1957

INVENTOR.
PIERO CROCCHI
BY
ATTORNEY

March 22, 1960 P. CROCCHI 2,929,198
DRIVE SYSTEM
Filed Feb. 25, 1957 2 Sheets-Sheet 2

INVENTOR.
PIERO CROCCHI
BY
ATTORNEY

United States Patent Office 2,929,198
Patented Mar. 22, 1960

2,929,198

DRIVE SYSTEM

Piero Crocchi, Rome, Italy

Application February 25, 1957, Serial No. 642,246

Claims priority, application Italy February 4, 1957

6 Claims. (Cl. 60—13)

This invention relates to a drive system for self-propelled vehicles.

It is the principal object of my invention to provide a drive system which is relatively simple in construction and operation, efficient and reliable and which requires no disconnectable clutch between the engine and propelling shaft.

Another object is to provide a drive system in which the engine, supercharger and output drive are associated in a novel way to effect a smooth, simple drive which is easy to service and operate and which requires only the use of the accelerator treadle for all forward speeds of the vehicle, from idling to maximum.

A still further object is to provide a drive system utilizing an engine-supercharger combination which balances the resistance of the supercharger and vehicle to afford smooth rapid acceleration and, at the same time, efficient use of the supercharger output.

A still further object is to provide a combination of elements as in the preceding paragraph, wherein the supercharger speed is maintained at an irreducible minimum required for efficient and satisfactory engine operation, while any excess capacity of the supercharger at speeds above the aforesaid minimum, is utilized to assist in driving the vehicle.

Still another object is to provide a vehicle drive of the type aforesaid, wherein engine exhaust gases and any excess supercharger capacity are combined to aid in propelling the vehicle.

Other objects and advantages will be apparent to those skilled in the art, after a study of the following detailed description in connection with the accompanying drawing.

Figure 1:
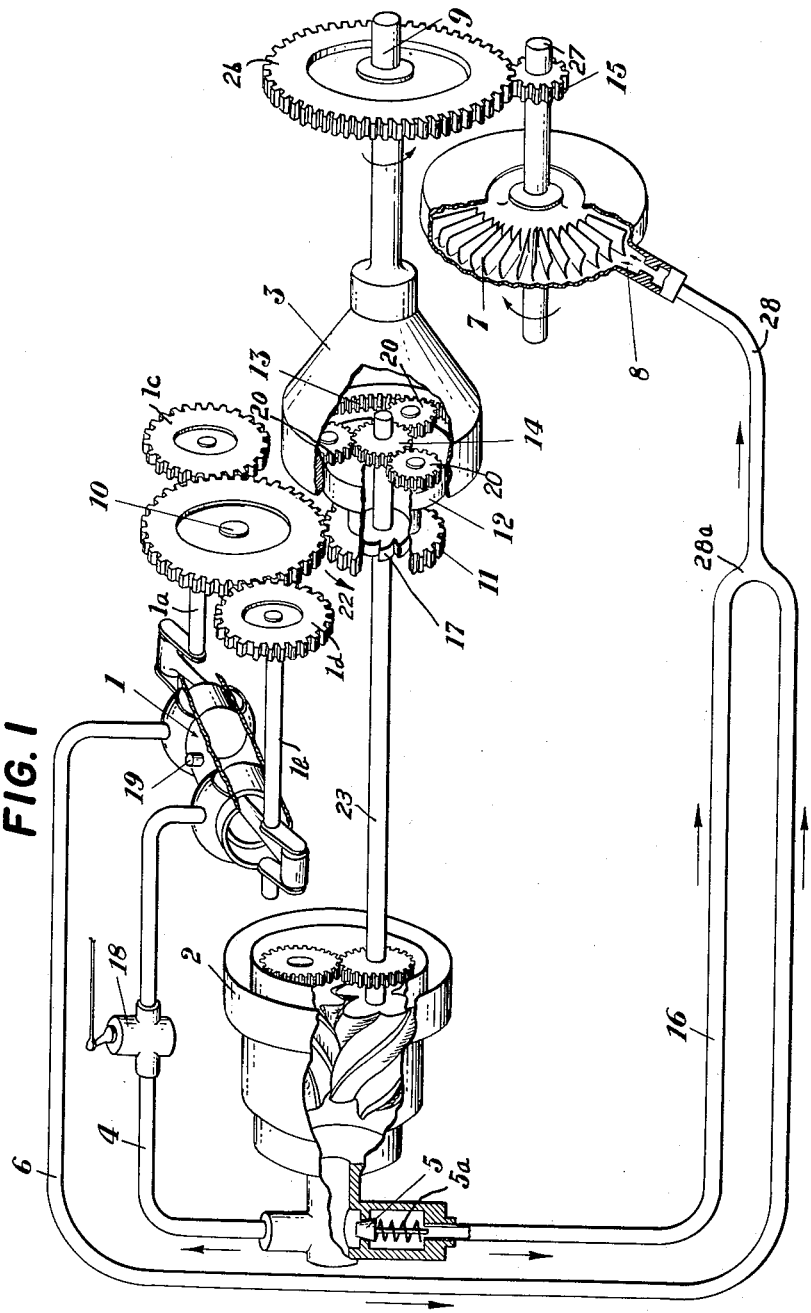
Figure 1 is a diagrammatic view partly in section, showing the elements of the invention and their interrelation.

Referring in detail to the drawing, 1 identifies a prime mover, shown merely by way of example, as an opposed piston, two stroke, internal explosion engine, supplied with pressure air from a supercharger or blower 2 of the positive displacement type. As in two-cycle diesel engines, fuel is injected directly into each cylinder at each rotation of the crankshaft, by means of injector 19. The amount of fuel thus injected is regulated by the driver, by means of a conventional foot treadle or accelerator, not shown.

A duct 4 connects the output of the supercharger with the engine and includes a control or vent valve 18 under control of the driver of the vehicle by means not shown, such as a conventional accelerator or foot treadle. The construction and arrangement are such that when valve 18 is open, that is, vented to the atmosphere, the pressure supplied by the supercharger by way of duct 4, is just sufficient to effect idling of the engine.

The engine is shown as having two crankshafts $1a$ and $1b$ as is known in this type of prime mover. Shafts $1a$ and $1b$ are directly connected to drive gears $1c$ and $1d$, respectively, both of which mesh with a single larger or drive gear 10.

Gear 10 in turn meshes with gear 11 which is unitary with the planet gear carrier 12 of a differential. A plurality of planet pinions 20 are journaled on the flat face of carrier 12 in uniform angularly-spaced relation about the center thereof, three being shown in the drawing.

Each planet pinion meshes with sun gear 14 fixed on supercharger shaft 23 and also with internal ring gear 13 integral with a housing 3. In turn housing 3 is integrally connected with shaft 9 which drives the wheels of the vehicle through conventional transmission means, including a differential, not shown.

So far as thus described, the differential operates in the same way as any machine element of this type. That is to say, the angular speeds of sun gear carrier and ring gear are determined by the equation:

$$\omega_{23} = (r+1)\omega_{12} - r\omega_{13} \qquad (1)$$

where:

$\omega_{23}$ is the angular speed of the supercharger shaft.

$\omega_{12}$ is the angular speed of the planet gear carrier and gear 11.

$\omega_{13}$ is the angular speed of ring gear 13 and transmission shaft 9.

$r$ is the ratio between the diameter of ring gear 13 and the diameter of the sun gear 14.

Let us assume for instance that gear 14 has the same diameter as the planetary gears 20. In this case, the diameter of ring gear 13 is evidently three times greater than the sun gear 14; that is to say: $r=3$. Therefore we have:

$$\omega_{23} = 4\omega_{12} - 3\omega_{13}$$

Thus, under the condition in which the engine is idling to rotate carrier 12 at an angular speed $\omega_{12}$ and the vehicle is at rest so that $\omega_{13}=0$, the angular speed of supercharger shaft 23 is four times that of the planet carrier.

Furthermore, it will be clear from inspection of Equation 1 that, assuming no change of engine speed, the angular velocity of supercharger shaft 23 drops as the vehicle picks up speed. In positive pressure superchargers, the pressure delivered to the engine increases when the ratio between angular speed of supercharger and angular speed of engine increases. Therefore, the pressure in duct 4 tends to be maximum when the vehicle is at rest, and will drop as the vehicle picks up speed.

Since a minimum output of the supercharger is required for any given engine speed over the normal range of vehicle speeds, I have provided an over-running clutch in association with the differential. This clutch is shown to include a ratchet means including ratchet wheel 17 fixed on shaft 23 within the hollow gear 11, in cooperation with a plurality of pawls 24, pivoted upon the interior face of gear 11 and spring-pressed into engagement with ratchet wheel 17. The arrangement is such that, looking from the right end of shaft 9, the overrunning clutch operates to drive shaft 23 in its assumed counterclockwise direction of operative rotation, whenever the speed of shaft 23 drops to a value equal to that of gear 11.

In other words, at all times when the angular speed of shaft 23 is in excess of the corresponding speed of gear 11, the differential acts independently of the overrunning clutch; but as soon as the speed of shaft 23 drops to a value equal to that of gear 11, the clutch becomes operative, so that shaft 23 is always driven at a speed equal to, or greater than, that of engine-driven gear 11.

Inspection of Equation 1 supra will show that when the overrunning clutch is effective to drive shaft 23, as aforesaid, $\omega_{23}=\omega_{13}=\omega_{12}$. Thus under the conditions stated, the supercharger is driven at a speed bearing a constant ratio to engine speed which ratio is selected by proper gear ratios between 1c, 1d, 10 and 11, to afford adequate but not excessive pressure for all engine speeds above a certain relatively low value. It will be understood that other known forms of overrunning clutches may be substituted for the one shown.

A gear 26 is fixed on shaft 9, and meshes with a pinion 15 fixed on a countershaft 27 with the vaned impeller turbine 7. The impeller is provided with a driving nozzle 8, supplied over a duct or conduit 28. This conduit divides at 28a into a first branch 16 conduit leading to a pressure-responsive valve 5 urged to closed position by a spring 5a. This valve is so constructed as to open when the output pressure of the supercharger exceeds a predetermined value.

The other branch conduit 6, is connected with the exhaust of the engine, so that the impeller 7 is driven by the combined effect of the engine exhaust plus any supercharger output over and above that required for the engine to augment the driving torque of the engine upon shaft 9.

In operation, with the engine at rest and the vehicle's brakes set, the driver opens valve 18 and energizes the starter, keeping the accelerator at a minimum. As the engine starts, due to the fact that the vehicle is at rest, supercharger shaft 23 rotates at four times the speed of gear 11. The valve 18 is so adjusted as to vent all but the pressure required for idling the engine, all excess capacity of the supercharger being vented under such conditions. The amount of fuel injected is a minimum and excessive fuel consumption at idling speed is avoided.

It is contemplated, as a matter of convenience, that valve 18 will be connected with the accelerator pedal, to be closed as soon as the pedal is pushed down. Of course, the accelerator and valve can be separately actuated provided they are operated in proper timed relation.

In order to start the vehicle, the driver will push down the accelerator to speed up the engine and will close valve 18. The supercharger is rotating at four times the speed of the motor, and therefore the pressure in duct 4, that is to say, the pressure of the air feed to the motor, and the resistive torque of the supercharger tend to a maximum value.

When the accelerator is pressed down, a maximum quantity of fuel will be injected in the cylinders, and therefore the torque furnished by the motor will be high. Therefore also the driving couple applied on shaft 9 will be high and the vehicle will start with a good acceleration.

Under such conditions, the capacity of the supercharger is in excess of that required by the engine and the pressure in duct 4 might become too high, except for valve 5. Thus during acceleration and at all other times when the pressure of air delivered by the supercharger exceeds a predetermined value, valve 5 opens against the urge of its spring and the excess capacity over and above that required by the engine aids in driving impeller 7 and thus effectively utilizes power otherwise lost to the ambient air.

As the vehicle picks up speed, the ratio of angular speed of supercharger to angular speed of the engine, gradually decreases. That percentage of the instantaneous output of the supercharger required to supply compressed air to the engine increases as the vehicle speed. Since the supercharger speed simultaneously decreases up to a certain increase in vehicle speed, valve 5 will close when the full capacity of the supercharger is required for engine operation.

At the instant that engine-driven gear 11, vehicle drive shaft 9 and supercharger drive shaft 23 are all rotating at the same speed, the overrunning clutch 17, etc., becomes effective on shaft 23.

Assuming further increase in vehicle speed beyond this point, engine speed, vehicle speed and supercharger speed will increase in substantially straight-line proportion. That is, an increment of increase in engine speed will, due to resistance of the vehicle, tend to effect a corresponding double increase in speed of the supercharger. The resistance of the supercharger to this increase will cause a corresponding increase in torque applied to shaft 9 with the result that the vehicle has a like increment of increase in linear speed. The action is smooth and continuous in effect, so that at every instant, a condition of equilibrium exists in which the power requirements and supercharger output are balanced against vehicle speed for all road conditions. For example, when the vehicle starts a climb, the increased resistance of the vehicle tends to slow shaft 9 and to correspondingly increase the speed of shaft 23. As the accelerator pedal is pressed down, the initial instantaneous result is to further increase supercharger speed. The increased resistance to turning of the supercharger then results in added engine torque on drive shaft 9 until a new condition of equilibrium is established. In all events, due to the overrunning clutch, the speed of supercharger shaft 23 can never drop below that of engine-driven gear 11 so that the engine is always assured of adequate air feeding under all conditions of speed and road.

Figure 2:
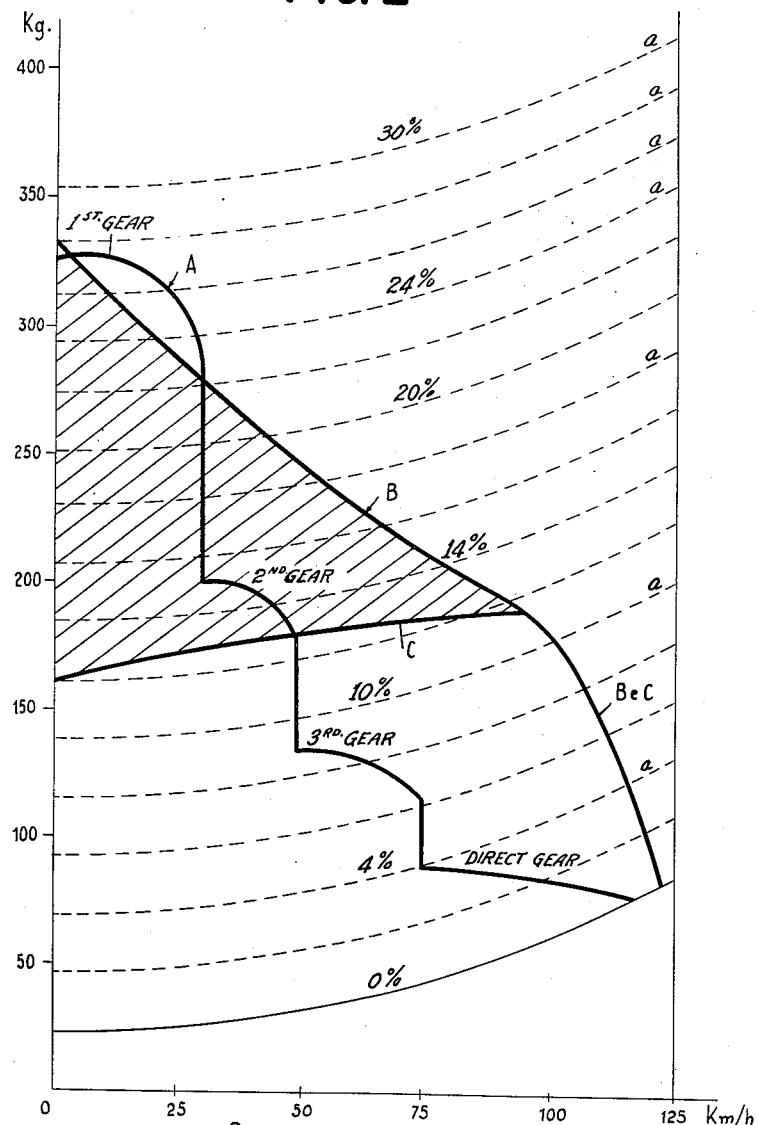
Figure 2 is a graph showing the improved performance of a motor vehicle embodying the present invention.
Figure 3:
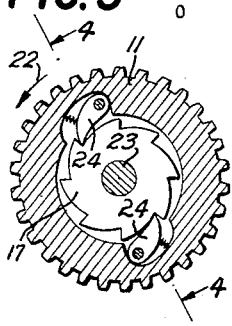
Figure 3 is a detail view of the overrunning clutch and taken in a plane identified by the line 3—3, Figure 4.
Figure 4:
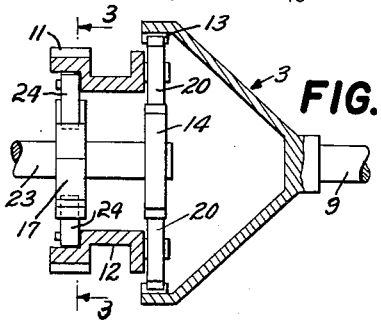
Figure 4 is a detail sectional view taken in a plane identified by the line 4—4, Figure 3, but showing in addition, the differential and its structural association with the overrunning clutch.

In the graph of Figure 2, abscissae represent speed of the vehicle in kilometers per hour and ordinates the resistance of the vehicle in kilograms. The locus of points having equal slopes is shown by the parabolic curves increasing with increased speed of the vehicle. Three separate curves "A," "B," and "C" are shown. Curve "A" represents the performance of a vehicle of the normal Fiat 1100/103 type, for purpose of comparison. Curve "B" represents the performance of a vehicle having the same weight and size as the car represented in curve "A" and equipped with a two-cycle opposed piston engine having a total displacement of 708 cc., a maximum speed of 3700 r.p.m. and equipped with a drive system according to the present invention. Curve "C" represents the performance of the vehicle equipped as in curve "B" but with valve 5 always closed so that there was no flow of air under pressure from the supercharger to turbine 7.

From the graph it will be noted that a car equipped as explained in connection with curve "C" would be incapable of traversing a slope of more than about 13%, while one equipped with a drive according to the present invention is able to traverse slopes up to 28%. The hatched area of the figure therefore represents the improved performance obtained by the present invention, using valve 5 and impeller 7.

I have thus provided a mechanical drive for vehicles which requires no clutch between the engine and vehicle drive shaft. The engine may be idled with the vehicle at rest, with minimum fuel consumption, and accelerated rapidly using the high back pressure of the supercharger, when valve 18 is closed, to retard shaft 23 and correspondingly increase the proportion of engine output effective on shaft 9. Furthermore the excess output of the supercharger over and above that required for efficient operation of the engine, is utilized to add further torque to the shaft 9.

In going down grade, the driver will set the accelerator pedal at minimum, the amount of fuel injected into the cylinders will therefore be very low, just sufficient to effect idling of the engine; the tendency of the vehicle to accelerate causes increased torque on shaft 23, which then acts as a brake.

Having now fully disclosed the invention, what I claim and desire to secure by Letters Patent is:

1. A drive system for vehicles operated by internal combustion motors having a direct injection of fuel into the cylinders, and a power output means, comprising in combination: a supercharger; a vehicle drive shaft; a central shaft with means connecting it to said power output means, said central shaft having two output drive means, and a differential gear train; the first of said output drive means mounted on said central shaft for rotation of said supercharger in the direction the same as that of said central shaft and at a speed at least equal to that of said central shaft; the second of said output drive means mounted for rotation with said vehicle drive shaft; a recovery turbine mounted on a shaft and gear means connecting it with said vehicle drive shaft to impart a supplemental torque; an exhaust conduit means connecting the exhaust of said motor with said turbine for rotation thereof; a bypass valve means mounted on the flow-outlet end of said supercharger, air conduit means connecting said bypass valve means with said motor for delivery of compressed air of predetermined pressure to said motor and, excess air conduit means connecting said bypass valve means with said exhaust conduit means for delivery of excess air pressure to said turbine as supplementary motive force.

2. A drive system for vehicles operated by internal combustion motors as claimed in claim 1, wherein said power output means comprise a motor gear-train, with a gear transmission from a toothed gear of the crankshaft of each cylinder to a common motor power output gear; wherein said means connecting said central shaft with said power output means comprise a central shaft gear meshing with said motor power output gear and mounted on a one-way ratchet means on said central shaft for locking in the driving direction, when said central shaft tends to assume a speed less than that of said central shaft gear.

3. A drive system for vehicles operated by internal combustion motors as claimed in claim 2, wherein said differential gear train comprises two coaxial gears, the outer coaxial gear being an internally toothed crown gear fixed to the said vehicle drive shaft and the inner axial gear being a sun gear fixed to the free end of the said central shaft; a planet wheel carrier and a plurality of planet wheels carried by the said planet wheel carrier and engaging the said coaxial gears; said one-way ratchet means mounted fixedly to said planet wheel carrier coaxially therewith, whereby upon decrease of speed of said central shaft below the speed of said central shaft gear said ratchet means lock said central shaft gear into driving engagement.

4. A drive system for vehicles operated by internal combustion motors as claimed in claim 1, further comprising vent valve means interposed in said air conduit means between said bypass valve and said motor for controlling the flow of compressed air to the said motor.

5. In a drive for a wheeled vehicle, a differential having first, second, and third sides, an engine connected to drive the first side of said differential, a supercharger connected to be driven by the second side of said differential, pressure connections from said supercharger to said engine supplying compressed air to said engine, a vehicle drive shaft, a driving connection between said vehicle drive shaft and the third side of said differential, and an overrunning clutch between the first and second sides of said differential and constructed and arranged to maintain the speed of said second side at least equal to the speed of said first side.

6. A drive for wheeled vehicles as recited in claim 5, a turbine rotor, a driving connection between said rotor and said vehicle drive shaft, a nozzle adapted to apply an impelling torque to said rotor, a pressure connection from said supercharger to said nozzle, and a pressure-actuated valve in said pressure connection and opening in response to a predetermined output pressure of said supercharger.

References Cited in the file of this patent

UNITED STATES PATENTS

| | | |
|---|---|---|
| 2,173,595 | Schütte | Sept. 19, 1939 |
| 2,803,942 | Johansson et al. | Aug. 27, 1957 |
| 2,804,748 | Hutchinson | Sept. 3, 1957 |

FOREIGN PATENTS

| | | |
|---|---|---|
| 886,240 | France | June 28, 1943 |
| 430,630 | Italy | Feb. 16, 1948 |